United States Patent
Riches et al.

(10) Patent No.: US 7,259,362 B1
(45) Date of Patent: Aug. 21, 2007

(54) IMAGING ARRANGEMENT AND METHOD FOR HIGH-SPEED IMAGING

(75) Inventors: Mark John Riches, Essex (GB); Roger James Frost Wilhem, Chelmsford (GB); Brian Arthur Cant, Laindon (GB)

(73) Assignee: DRS Tactical Systems Limited, Farnham, Surrey (GB)

( * ) Notice: Subject to any disclaimer, the term of this patent is extended or adjusted under 35 U.S.C. 154(b) by 0 days.

(21) Appl. No.: 09/701,559

(22) PCT Filed: Jun. 4, 1999

(86) PCT No.: PCT/GB99/01763

§ 371 (c)(1),
(2), (4) Date: Feb. 5, 2001

(87) PCT Pub. No.: WO99/64911

PCT Pub. Date: Dec. 16, 1999

(30) Foreign Application Priority Data

Feb. 1, 1959 (GB) .................................. 9903428
Jun. 5, 1998 (GB) .................................. 9812210

(51) Int. Cl.
*H01J 40/14* (2006.01)

(52) U.S. Cl. .............................. 250/214 VT; 313/531; 313/542

(58) Field of Classification Search ......... 250/214 VT, 250/214.25, 208.1, 226, 216; 313/103 CM, 313/105 CM, 542, 540, 531
See application file for complete search history.

(56) References Cited

U.S. PATENT DOCUMENTS

| | | | | |
|---|---|---|---|---|
| 3,654,475 A | * | 4/1972 | Montpas | 250/203.6 |
| 3,740,112 A | | 6/1973 | Lundgren | 350/96 T |
| 4,024,391 A | * | 5/1977 | Bosserman et al. | 250/214 VT |
| 4,177,487 A | * | 12/1979 | Takenouchi et al. | 358/474 |
| 4,769,552 A | | 9/1988 | Boue et al. | 250/578 |
| 5,001,348 A | * | 3/1991 | Dirscherl et al. | 250/372 |
| 5,029,009 A | * | 7/1991 | Ulich et al. | 348/217.1 |

FOREIGN PATENT DOCUMENTS

| | | |
|---|---|---|
| EP | 0 029 568 | 6/1981 |
| EP | 0 617 450 | 9/1994 |
| EP | 0701185 A1 * | 3/1996 |
| EP | 0 766 317 | 4/1997 |
| GB | 528588 | 11/1940 |

(Continued)

OTHER PUBLICATIONS

"Entwurf eines bildwandlerkurzzeitverschlusses für öffnungszeiten T=5×10-11s," Electronic Letters, vol. 1, No. 1, Mar. 1965.

*Primary Examiner*—Thanh A. Luu
(74) *Attorney, Agent, or Firm*—Sonnenschein Nath & Rosenthal LLP (57) ABSTRACT

An electro-optic device is disclosed which has a plurality of independently-gatable portions. One example is an image intensifier having a number of segmented photocathode areas (GP). The corresponding portions of the intensifier can be energized independently via contact stripe (CS). Used in conjunction with an appropriate trigger signal generator, imaging device and beam splitter, the device may be used to capture a series of images at very high speed. An electrical device having a reflective tunnel for generating a plurality of input images is also disclosed.

17 Claims, 6 Drawing Sheets

FOREIGN PATENT DOCUMENTS

| | | |
|---|---|---|
| GB | 922923 | 4/1963 |
| GB | 1395 580 | 5/1975 |
| GB | 2 160 013 | 12/1985 |
| GB | 2 186 151 | 8/1987 |
| GB | 2 244 863 | 12/1991 |
| GB | 2 276 512 | 12/1992 |
| GB | 2 284 273 | 9/1994 |
| GB | 2 289 979 | 12/1995 |
| GB | 2 322 230 | 8/1998 |
| WO | WO95/14951 | 6/1995 |

\* cited by examiner

3 x 3 Array imaged onto 40mm (scale x0.5)

Fig. 12

IMAGING ARRANGEMENT AND METHOD FOR HIGH-SPEED IMAGING

The present invention relates to an imaging arrangement and method, particularly to an arrangement and method for high speed imaging, typically taking a sequence of pictures at frame rates in excess of 1000/second. The invention also relates to an electro-optical device for use in such an arrangement.

Many applications require imaging at frame speeds in the range from approximately 2,000 frames/sec to 100,000,000 frames/sec. These include analysis of lightning, sparks resulting from electrical discharge, shock waves, fuel injection and fluid dynamics. Conventional film and video systems are convenient and usually reasonably priced but are only capable of frame rates of up to approximately 100,000 frames/sec (fps).

At ultra high speed (greater than 100,000 fps) a beam splitter or rotating mirror/prism is typically employed together with some shuttering arrangement to record the image at a succession of different physical locations at consecutive points in time. The actual recording can be performed, for example, using conventional film or charge-coupled device (CCD) cameras.

The drawback with film and video techniques is that the systems are usually very clumsy, film systems relying on rotating mirrors or prisms which give limited flexibility in exposure times and frame rate. The cost of developing film can also be very high. Moreover the frame rate must be set for, and cannot be varied during, each "run".

An electronic technique using a multiple camera approach is described in International patent application publication number WO 95/14951 in which a beam-splitter generates 8 images which are applied to eight different cameras. These cameras may be gated in sequence to capture images at extremely high rates indeed. A wide selection of exposure time and frame rate can usually be made with such an arrangement. A limited number of frames is admittedly provided but this is seldom a drawback in the applications to which such imaging systems are put. Apart from sheer size, the main drawback of such an arrangement is cost. Using 8 optical gates (intensifiers) and 8 CCD cameras, such an imaging system might cost £200,000.

The present invention has for its object to provide a less expensive arrangement and method suitable for capturing high speed events.

According to a first aspect of the present invention there is provided an electro-optic device comprising a photosensitive surface which surface is arranged to comprise a plurality of independently-gatable portions.

The invention also comprises an imaging arrangement for two dimensional optical data represented by at least two beams of electromagnetic radiation, the arrangement comprising: means for gating and converting the beams into image data, which means for gating and converting the beams into image data includes a single electro-optic device according to the first aspect of the invention, wherein the independently-gated portions corresponding to each of the plurality of beams.

Two dimensional optical data will typically comprise a conventional optical image, but not necessarily so.

In one embodiment, the electro-optic device comprises an image intensifier. The image intensifier conveniently has a divided photocathode in which each divided portion may be gated independently. Typically the independently-gated portions comprise separate conductive segments of a layer adjacent a conventional photocathode which typically has extremely high resistivity. A single camera may be used to provide a particularly low cost arrangement although a number of cameras, could be used if desired. While the imaging apparatus may be applied to a film camera, in a preferred embodiment a solid state imager is provided.

The term "solid state imager" as used herein is intended to encompass a variety of electronic array sensors such as CCD (Charge Coupled Devices), CID (Charge Injection Devices), MOS and CMOS (Complementary Metal Oxide) and amorphous silicon devices.

Alternatively the electro-optic device comprises a solid state imager divided into separately-gatable portions. Such an imager could then be used with or without an image intensifier depending upon the amount of light energy available and the exposure time desired.

Such an imaging arrangement may include a beam splitting arrangement that derives the at least two beams of electromagnetic radiation from a single incident beam of electromagnetic radiation. The arrangement may further perform colour separation to provide a colour imaging device. The individual colours may be gated but, more likely all of the colours from a particular image in time will be gated together. In one dimension, therefore, the beam splitting arrangement is chromatic. The beam splitting arrangement may then be achromatic in the orthogonal dimension to enable a high speed imaging system to be provided. Colour separation can be performed in a number of different ways, for example using colour filters.

The gating may be performed by a Kerr or Pockel cell or other "passive" optical device.

Accordingly, the present invention further provides an imaging arrangement for two dimensional optical data represented by an incident beam of electromagnetic radiation, the arrangement comprising: means for splitting the incident radiation beam into a plurality of beams, means for gating and converting the beams into image data, wherein the means for gating and converting the beam into image data includes a single electro- optic device having independently-gated portions corresponding to each of the plurality of beams.

The invention also provides a method of imaging two dimensional optical data represented by a beam of electromagnetic radiation, the method comprising:
  splitting the radiation beam into a plurality of beams;
  gating the plurality of beams;
  converting the gated beams into image data;
  wherein the gating of the plurality of beams is performed using a single electro- optic device having independently-gated portions corresponding to each of the plurality of beams.

It is a further object of the present invention to provide a method and apparatus of generating a plurality of images N from one input image which apparatus is suitable for use with the other aspects of the present invention.

High quality beam-splitting arrangements are difficult to design and expensive to produce. A beam-splitter which provides four images and having a quality suitable for higher speed photographic applications might typically cost £5000 per item.

According to a further aspect of the invention, therefore, there is provided apparatus for providing a plurality of images N from one input image, the apparatus comprising: an input objective lens for transmitting the input image to an input of a reflecting tunnel; a reflecting tunnel having an input and output between which are provided at least two reflecting planes, each of which reflecting planes is orthogonal to any adjacent reflecting planes; and an output objective lens for receiving the output images from the reflecting tunnel.

By using a reflecting tunnel to generate the multiple images an extremely cost-effective beam-splitter is provided. Generally speaking, the reflecting planes will be parallel to the optical axis. Two, three or four reflecting planes are provided in dependence upon the number of images required as discussed more fully below.

The reflecting planes may be inwardly-facing mirrors or they may be the boundaries of a single block of glass (or other optical material) within which there is total internal reflection.

The cross-section of the reflecting tunnel may be rectangular or square.

The dimensions of the reflecting tunnel may be calculated in accordance with a method of manufacturing apparatus for providing a plurality of images N from one input image, the method comprising: determining an integer K greater than one such that $K^2 \geq N$; selecting an input objective lens having f number (F/No) and image height H values; selecting a material for a reflecting tunnel which material has a refractive index RI; determining the minimum length L of the reflecting tunnel from the equation: $L=K \times (F/No) \times H \times RI$; constructing a tunnel having height H and a length of L or greater; arranging the input objective lens at a first end of the reflecting tunnel; and arranging an output objective lens at a second end of the tunnel.

The variable K is the array size and denotes the number of images on one side of the output array. If K=3, therefore, there will be nine images in the output array for a four-sided tunnel. Consequently, $K^2$ must be selected to be greater than or equal to N. The length L of the reflecting tunnel can then readily be derived from the equation above.

The present invention also provides an electro-optic device for generating a plurality of gated images N from one input image, the apparatus comprising: an input objective lens for transmitting the input image to an input of a reflecting tunnel; a reflecting tunnel having an input and an output between which are provided at least two reflecting planes, each of which reflecting planes is orthogonal to any adjacent reflecting planes; an output objective lens for transmitting light from an output of the reflecting tunnel to an electro-optic device; and an electro-optic device comprising a photosensitive surface which surface is arranged to comprise a plurality of independently-gatable portions.

An extremely cost-effective electro-optic device is thus provided in which the beam splitting and the gating of the images is still of high optical quality but at considerably reduced prices compared with the precision optical and multiple camera arrangements of the prior art.

While arrangements and methods are described herein in the context of visible light, it will be understood that the present invention is equally applicable to ultraviolet (UV) and infra-red (IR) radiation.

The present invention will now be explained and described by way of example with reference to the accompanying drawings in which.

Figure 1:
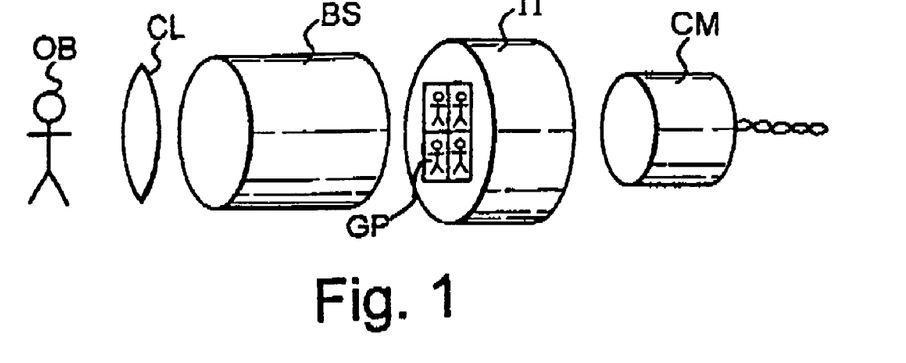
FIG. 1 shows a schematic diagram of an imaging system according to an embodiment of the invention.

In FIG. 1 light from an object OB passes through a conventional lens CL and enters a beam splitter BS which will be described in more detail subsequently. The beam splitter provides four identical images to an image intensifier II. It is assumed for the time being that the beam splitter is achromatic, in other words it effects no colour separation. The four images fall on the image intensifier to coincide with individually gated portions GP of the intensifier. These may be readily provided by controlling the deposition of the conductive material applied to the photocathode to reduce its resistance.

By gating the individually gatable portions of the image intensifier in sequence, four different, intensified images are supplied to a camera CM, for example a solid state imager such as a CCD camera. Between the image intensifier and the camera a relay lens or fibre optic block (not shown) will typically be provided. The time resolved imaging of an event is thus recorded by the different positions of the image on the camera surface. Such a camera may comprise a CCD47-20 image sensor which is available from EEV of Waterhouse Lane, Chelmsford, Essex CM1 2QU, England. This sensor has an image area of 13.3 mm by 13.3 mm with an image format of 1024×1024 pixels. Thus, each of the four images may be recorded with a resolution of up to 512×512 pixels. By altering the gating signals applied to the image intensifier and the beam splitter optics it would be possible to record a pair of images at up to 1024×512 resolution. The readout of the image information can be performed in traditional manner.

Typically the sensor will be cleared prior to an imaging "run". If the event sought to be recorded did not occur during the run then the image information may be discarded or overwritten. The triggering of the sensor may be performed at the start of the event or, where the radiation levels at the start of an event may fail to trigger recording, using a "post-trigger" technique as described in European Patent Application EP 0701185A1. Briefly, such a technique records continually until a trigger signal "freezes" the data obtained for the previous few frames.

A segmented CCD approach may have separate "erasing" sections to facilitate this technique or use techniques akin to the ISIS CCD's etc., i.e. a means of "charge dumping" as a term used in the art. See, for example, International Patent Application WO97/43788.

Figure 2:
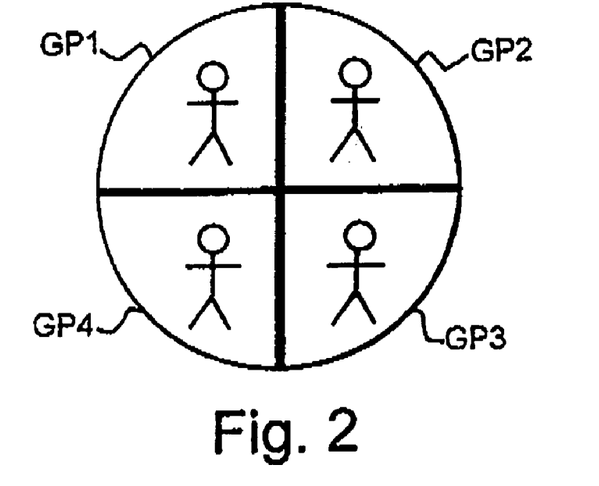
FIG. 2 shows a schematic plan view of the photocathode of the image intensifier shown in FIG. 1.

FIG. 2 shows a plan view of the photocathode of the image intensifier shown in FIG. 1. This may have a diameter of, for example, 18 mm or 40 mm. The photocathode is typically a high resistance layer. In "static" (ungated) applications this causes no problems because the necessary (small) current for the electron beam can be supplied quickly enough from the periphery to all of the points on the photocathode. In gated applications, however, it is necessary to supply and remove the charge more quickly, i.e. to charge the photocathode PC capacitance. This can result in "irising" where the centre of the photocathode lags the periphery despite the source of charge having added or removed charge from the periphery of the photocathode. A known solution to this problem is to provide an additional conductive layer next to the photocathode. Such a layer is typically made from Nickel or Antimony.

In the present embodiment this conductive layer is divided into four equal segments. Between each of the segments is a small gap of 1 mm or less shown by a dark line (it could be more but there will be a consequent loss of control over the gating in the gap and waste of imaging area). Each of the segments is connected to receive a respective gating pulse GP1, GP2, GP3 and GP4. The total resistance across each gap between segments will typically be 5 Ω or more. The resistance across each segment will typically be 200 Ω. Capacitive coupling to the segments may be used instead.

Figure 3:
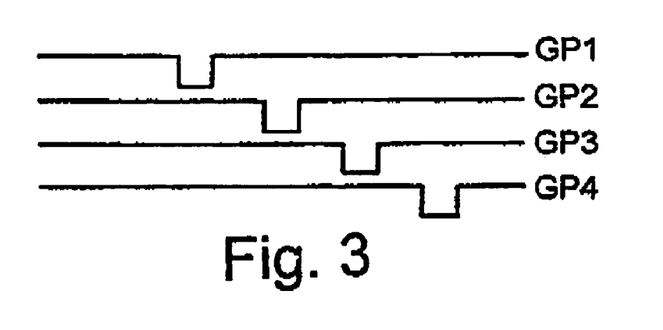
FIG. 3 shows an exemplary set of gate trigger signals for use with the arrangement shown in FIGS. 1 and 2.

FIG. 3 shows a possible set of gating pulses that could be used with the arrangement of FIG. 1. These pulses typically comprise an "off" level of approximately +50V (relative to the microchannel plate input) and an "on" level of −200V. In the example shown in FIG. 3, the four segments of the photocathode are triggered in turn for a short duration and there is an optional small delay before the next segment is triggered. The trigger duration may typically be as short as 2–3 ns but may be as long as 100 µs or much longer. A typical extinction ratio is $10^{10}$ so there is an excellent distinction between the "on" and "off" states.

While resettable (erasable) CCD cameras are known they have previously only been available in which the whole of the imaging area is erasable. One such camera could be used for each of the separated images. By typically applying the anti-blooming structure in a segmented fashion as described for the photocathode above, a segmented CCD may be provided that allows erasure on a per-segment basis. The segmented CCD would appear as shown in FIG. 2 but with reset/erase lines instead of gate-pulse lines. This may then be used in conjunction with the segmented image intensifier to provide a continuous imaging system. The relevant segment of the CCD camera is cleared by a reset pulse before the relevant segment of the image intensifier is gated so that the relevant part of the CCD is cleared by the time it is exposed. Typically, the pulse timing applied to clear the portion of the CCD will be that used to gate the portion of the image intensifier one or two exposure times previously. Other periods of delay between clearing and exposing the portion of the CCD may be used subject to the constraint that the CCD portion is cleared prior to exposure (it typically takes approximately 1 µs to clear the CCD with a vertical anti-blooming structure).

Such an arrangement may be used to provide a continuous imaging system provided with a "post-trigger" arrangement described in the European Patent Application identified above.

A CCD camera may itself be provided with triggering means that operate upon on a number of discrete segments of the camera in accordance with the present invention. Such a camera may further be provided with erasing means as discussed above. Typically one would segment an anti-blooming structure for erasure control and also any electronic gating techniques that may be employed (interline transfer regions, in situ image storage (ISIS) devices etc.).

Figure 4:
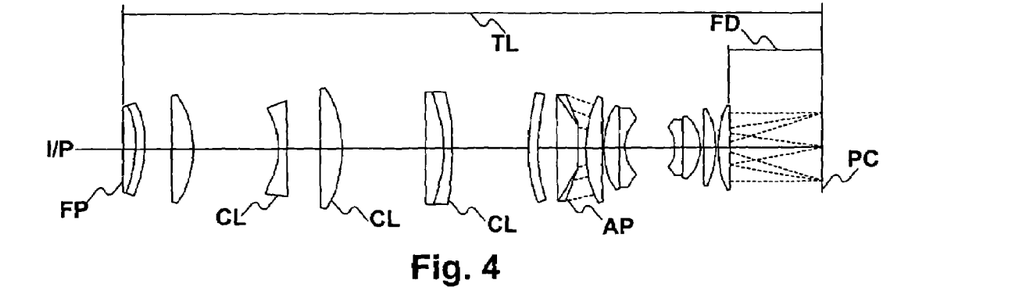
FIG. 4 shows an exemplary embodiment of the beam splitter optics from FIG. 1.

FIG. 4 shows an elevational view of an optical system for providing beam splitting, in this example into four different images in two rows of two. A four faceted achromatic prism is used as the actual beam splitting device.

An input optical signal I/P is applied to the left of the device as shown in the Figure. At the right hand side of the figure is the photocathode PC of the image intensifier II shown in FIG. 1. The total length TL of the optical system is approximately 355 mm. The flange distance FD is the distance between the final optical element and the photocathode of the image intensifier. The straight line to the left of the figure is the focal plane FP for the input light. The input beam is subject to a number of conventional lenses CL to achieve collimation prior to being applied to the achromatic prism AP. This collimation is loosely based on a Petzval lens. In this instance the prism is a four-sided truncated pyramid. Other shapes will be required in different circumstances, for example the eight times three faceted, colour-splitting optical element required for use with an intensifier shown partly in FIG. 7 which will be discussed later. The optical elements to the right of the prism form an objective lens which collects the collimated light deviated by the prism and is similar to a conventional photographic lens such as a high performance, high numerical aperture objective lens which offers very low vignetting. The collimation lens and the objective lens as a whole form a relay lens (which includes beam splitting or colour separation).

The beam splitter, in particular the achromatic prism will need careful design to ensure separation of, and equal intensity for, each of the split beams. A beam splitting arrangement meeting such requirements is well within the competence of the relevant optical engineer. Other beam splitting techniques are equally applicable.

The important features for such techniques are that there is even performance across the field of view and that the input light is accurately collimated prior to being applied to the prism.

The optical system comprises a collimator lens comprising the elements prior to the beam splitter AP followed by an objective lens system to throw the image onto the photocathode PC.

Figure 8:
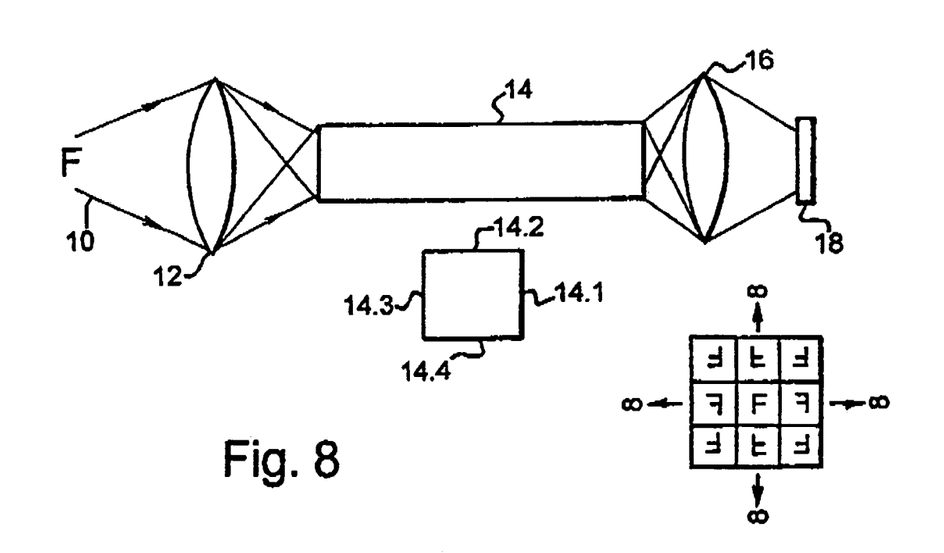
FIG. 8 shows a simple schematic diagram illustrating the principle of a beam-splitter in accordance with the present invention.

A particularly preferred beam splitter for use with the electro-optic device is shown in FIG. 8. In FIG. 8 an image (illustrated here as a capital letter "F") passes through a conventional objective lens 12, which is preferably a high aperture lens. Light from this lens passes to a reflecting tunnel 14 whose cross section is also shown. The reflecting tunnel 14 has four reflecting planes 14.1, 14.2, 14.3 and 14.4 each of which is orthogonal to the adjacent reflecting planes. The reflecting tunnel may comprise four inwardly-facing mirrors or a block of optical material whose faces provide total internal reflection within the tunnel. Light emerging from the tunnel 14 is applied to an output objective lens 16 (see FIG. 11) which is preferably a wide angle, short focal length lens which focuses the multiple images from the output of the tunnel 14 onto an electro- optic device 18.

To the right of FIG. 8 is the pattern of multiple images applied to the electro-optic device. Nine images are shown in a 3×3 array but larger numbers of images are possible as will be discussed later. The maximum number depends upon the pixels available on the CCD and hence the number of pixels in image, of the array and the amount of detail required for analysis. As can be seen in the figure, the adjacent images are inverted with respect to one another but this can readily be taken care of in subsequent processing. For example, in the case of a charge coupled device (CCD) camera the relevant data can be re-ordered when read out from the device.

The CCD camera could be of any type or form, high speed, high resolution etc. A colour system using different filters is described below.

While the image tunnel 14 is shown as having four reflecting planes, as a minimum, two reflecting planes which are mutually orthogonal can be provided. The number of output images along each side of the array is denoted as K. When K=3 and two reflecting planes are provided there will be four object images. When K=3 and three reflecting planes are provided then there will be six output images.

Figure 9:
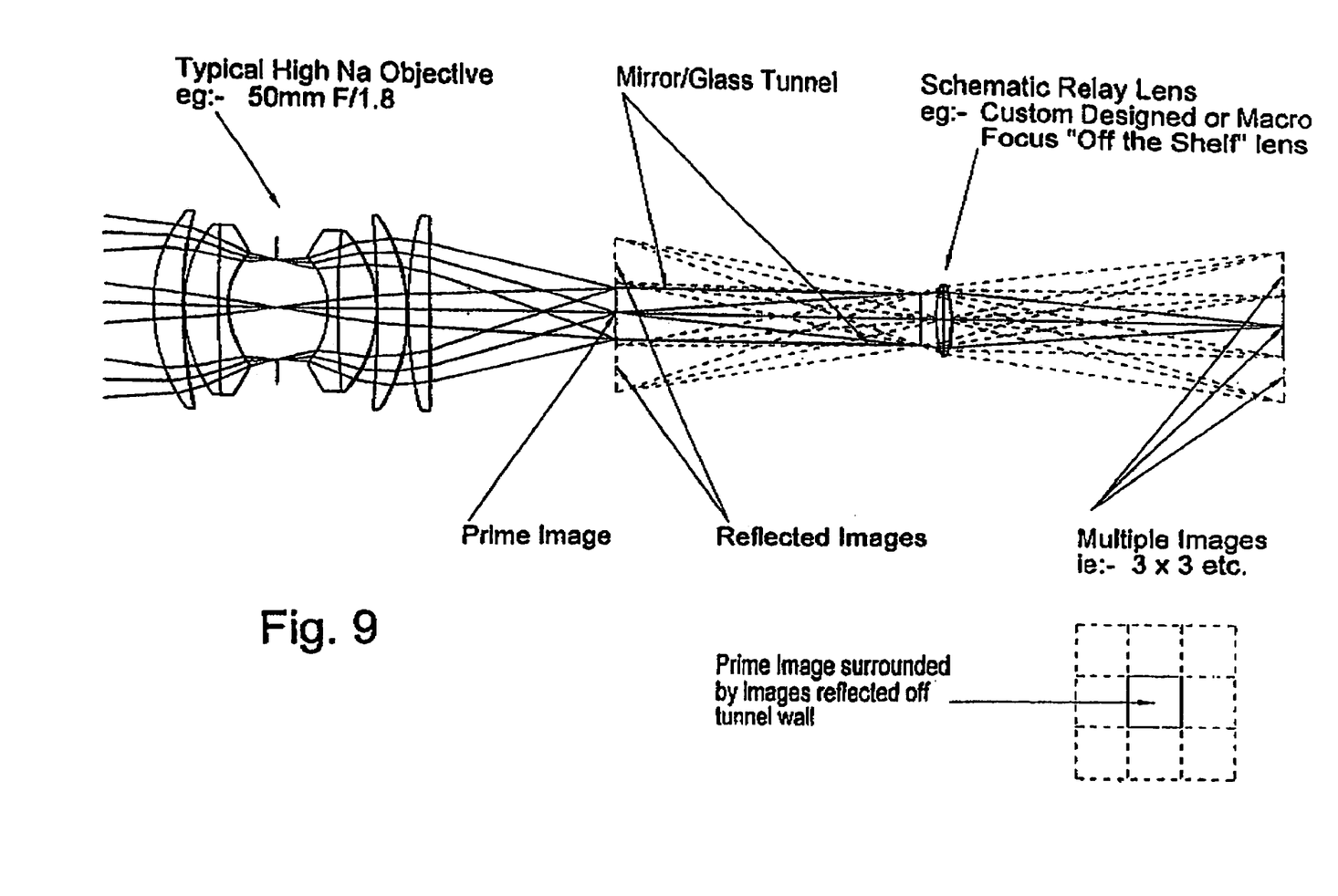
FIG. 9 shows a more detailed diagram of the beam splitter in which a number of ray lines are shown.

FIG. 9 shows a more detailed version of the simple schematic diagram shown in FIG. 8. A high Numerical Aperture (NA) objective lens 12 comprises five separate lenses 12.1., 12.2 . . . 12.5. The design and construction of such a lens is well within the competence of the relevant skilled person. Typical characteristics of such a lens would be: 50 mm F/1.8. Light rays from an image (not shown) are conveyed by this lens to the reflecting tunnel 14.

While a lens 12 (FIG. 8) and a high N.A. objective (FIG. 9) have been described, these are not essential. What is important for the tunnel beamsplitter (and other types) is that the Prime Image (FIG. 9) has a high N.A. value (in other words is well scattered). If the input is highly collimated there will be insufficient reflection off the sides of the tunnel.

As a further alternative an ordinary (unsegmented) image intensifier with fibre-optic output may be used as the input image plane, in other words replacing the real image formed by the conventional objective lens. In this case the fibre optic block at the output of the intensifier is made to coincide with the Prime Image (FIG. 9) for direct coupling to the tunnel. This ordinary intensifier may also give UV or IR, XRAY to visible conversion, more gain and so on but, importantly, the output at its fibre optic screen will be high N.A. The N.A will be 1 or very close to 1 with the consequence that relay lens systems would likely be inefficient. Direct coupling to the tunnel is then ideal because a tunnel would be very efficient if configured for f/1 or less, as is possible (see below). Indeed all that the tunnel requires is that the image at the entrance to the tunnel is of high N.A. Also where the source is ultraviolet or a conversion to ultraviolet has been effected the tunnel is ideal. This beamsplitter is intrinsically UV capable because mirrors reflect UV light while, by contrast, a prism would need to be designed specifically.

The output objective lens 16 or schematic relay lens may be an "off the shelf" macro focus lens or a custom designed lens as will be described with reference to FIG. 11.

As can be seen from the Figure, the light from the input image is reflected within the tunnel 14 to provide the required number of output images. The number of images will be defined by the maximum entrance angle of rays from the objective lens entering the mirror tunnel; the maximum angle of reflection of the mirror system (total internal reflection in the case of a solid block of optical material) and the field of view of the output objective lens. The relevant calculations will be described below with reference to FIG. 10.

Figure 10:
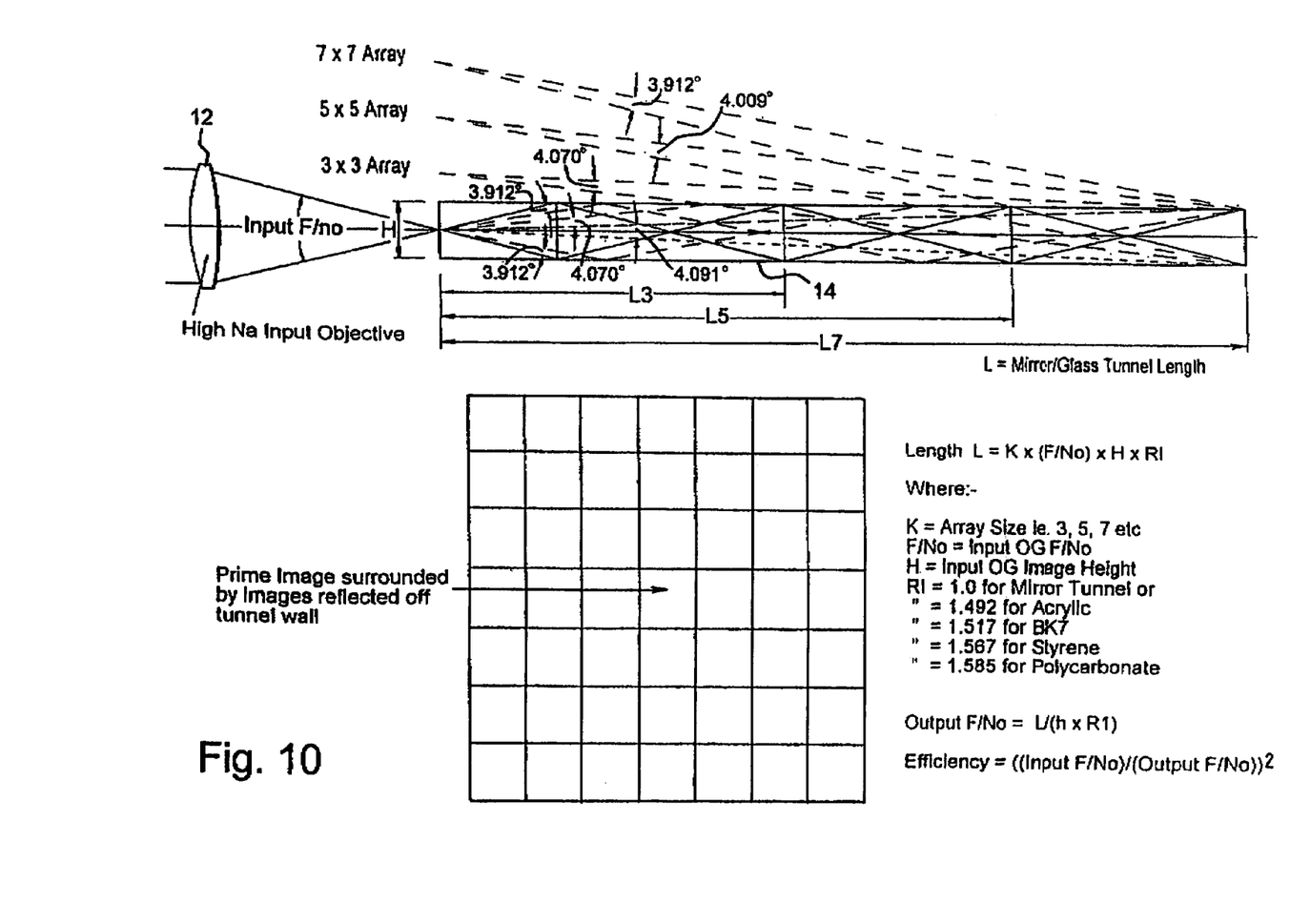
FIG. 10 shows a diagram of a part of the beam splitter illustrating how the length of the reflecting tunnel is calculated.

FIG. 10 shows a schematic view of the reflection of the light beams within the reflecting tunnel 14 having four reflecting planes. The height of the tunnel is shown as H and the length of the tunnel is shown as L. If the total length of the reflecting tunnel shown is used then a 7×7 array of output images will be produced. This length is also denoted as L7. Two shorter lengths are denoted as L3 and L5. These correspond with the length of tunnel required to provide a 3×3 array and a 5×5 array respectively. Because there will always be a straight-through or prime image in the centre of the output image array, each side of the array must always comprise an odd number of images. When all four sides are present, the beam splitter can be arranged to provide values of N equal to 9, 25, 49 and so on. If only three sides are present then the images along one side of the array are omitted. When K=3 then six images will be provided. If only two sides are present then the images along two sides of the array are omitted. When K=3 then four images will be provided.

The length of tunnel required can be calculated from the following equation:

$$L = K \times (F/No) \times H \times RI$$

where K equals the number of output images along one side of the array, i.e. 3, 5, 7, etc.

F/No=input OG Aperture Ratio (Aperture ratio=Focal length of lens/Entrance pupil diameter and OG=Objective Glass or just Objective) H=input OG image height $$RI = \text{refractive index, i.e.: 1.0 for mirror tunnel or}$$
$$= 1.492 \text{ for Acrylic}$$
$$= 1.517 \text{ for BK7 Glass (Schott)}$$
$$= 1.567 \text{ for Styrene}$$
$$= 1.585 \text{ for Polycarbonate}$$

The field of view of the Output Relay lens is:—

$$FOV = \pm \tan^{-1}(0.7071/\text{Aperture Ratio})$$

Figure 11:
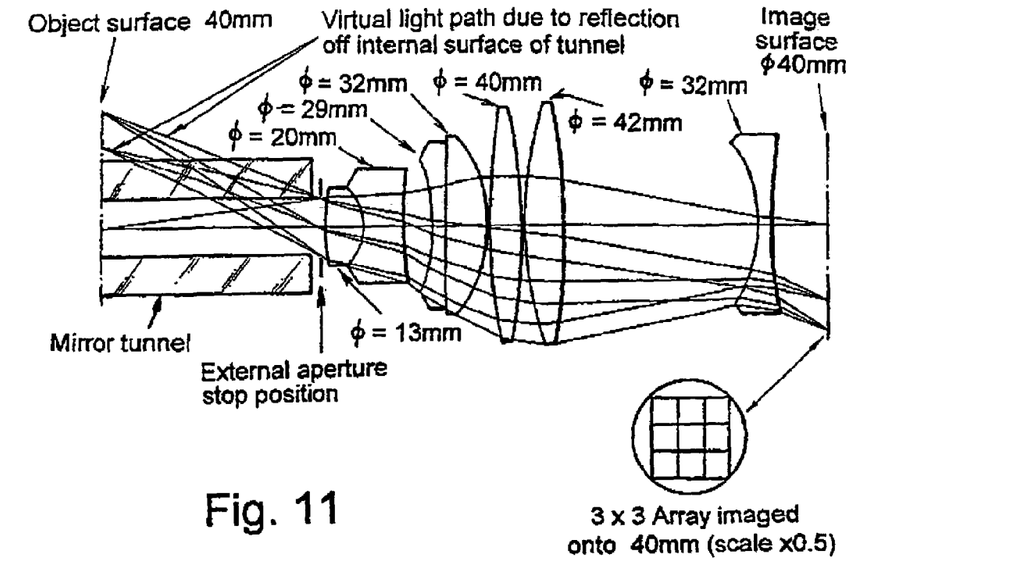
FIG. 11 shows a diagram of a relay lens for use with the beam splitter.

FIG. 11 shows a relay lens having the following characteristics:
(a) External Aperture stop positioned very near to the end of the tunnel.
(b) No vignetting
(c) uniform performance
(d) iris at stop position The figure is to scale and, in absolute terms, is just under twice actual size.

The above has assumed that the tunnel has a square cross section. However, the invention is equally applicable to a rectangular cross section with one dimension being W and the other being H. The field of view becomes:—

$$FOV = \tan^{-1} \sqrt{(H^2 + W^2)}/(2. F/No. H)$$

where H is the larger of the two cross section dimensions. When the tunnel has a square cross section then H=W and the formula simplifies to that given above.

Figure 5:
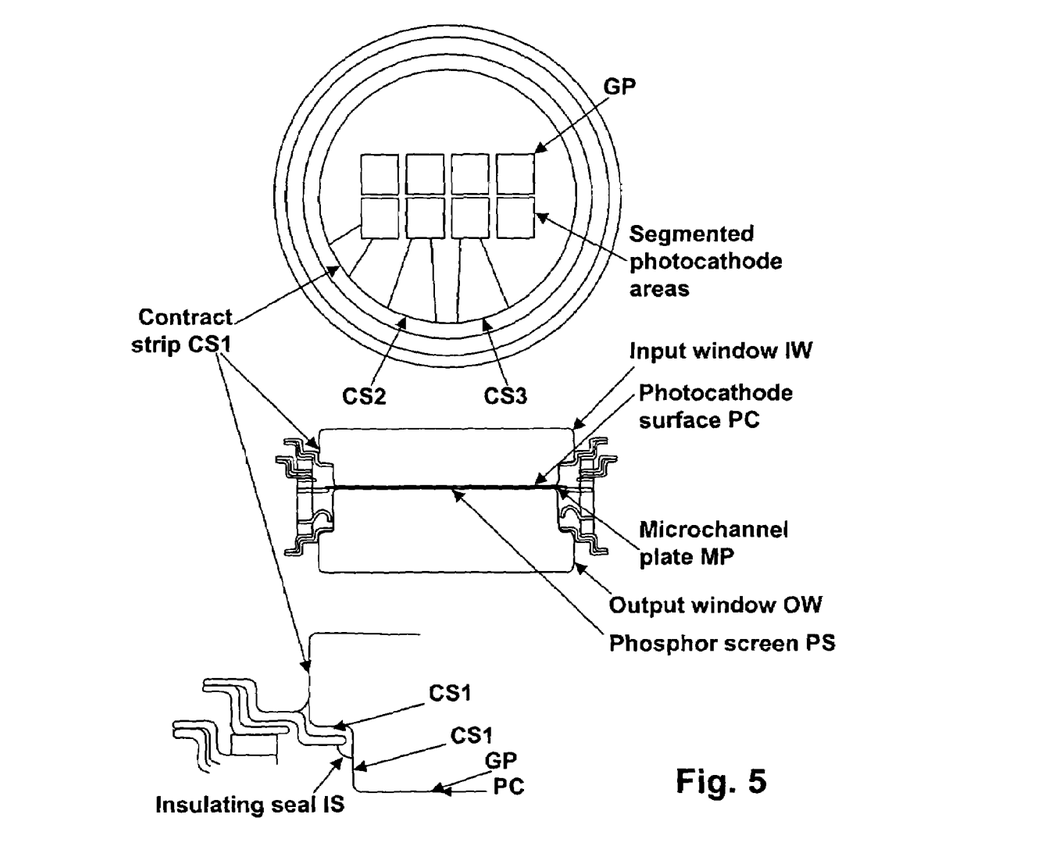
FIG. 5 shows a schematic plan view of an image intensifier according to an embodiment of one aspect of the invention and for use with an imaging system according to another aspect of the invention.

FIG. 5 shows a plan view and a side view of an image intensifier having eight individually triggerable segments in two rows of four. The plan view shows the segments or gatable portions GP. The side view shows that the intensifier is of conventional construction—for example using a copper press-off technique (cold copper seal) as is well known. The intensifier comprises an input window IW, onto the internal surface of which are deposited, using a mask, a number of individual areas of semi- transmitting conductive material, to create the gated portions GP which are connected to conducting strips CS 1, CS 2, CS 3, etc., on the edge of the input window. The input window is joined to a metal ring by an insulating seal IS thereby allowing each of the conducting strips to remain electrically isolated. A photocathode surface PC is deposited over the surface of the input window and the semi-transmitting conductive areas.

Beyond the photocathode and isolated from it by a thin layer of vacuum is the microchannel plate MP of conventional construction which is isolated from a phosphor screen PS by another thin layer of vacuum. The phosphor screen is deposited on the internal surface of the output window OW. The output window if manufactured from fibre optics may directly abut the CCD or may be separated therefrom by a fibre optic block. In its simplest form the construction of an image intensifier in accordance with the invention is entirely conventional with the exception of the masking applied to the conductive layer adjacent the photocathode and the connections around the edge of the input window. The unit operates in an entirely conventional manner with the exception of the individually gatable portions. Note that the gap between the segments is a conventional photocathode and is also light sensitive.

Figure 12:
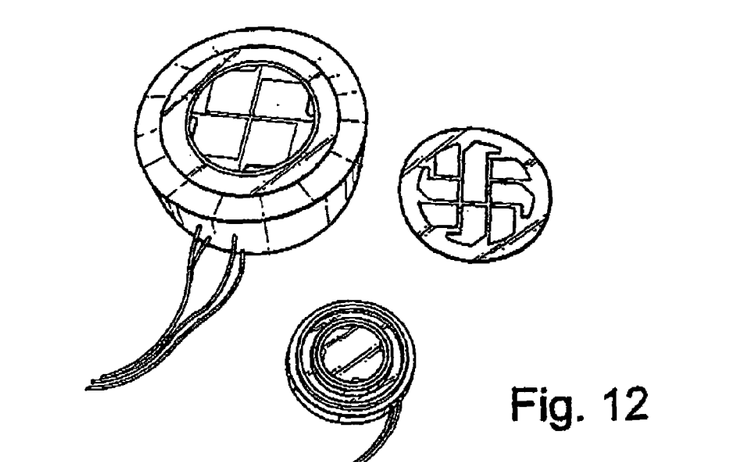
FIG. 12 shows some components of an image intensifier according to an embodiment of the invention.

The intensifier may be made in any size format, for example standard 18 mm or 40 mm. FIG. 12 shows a complete 40 mm intensfier (left) and an 18 mm intesifier each having four gated sections. Also shown is a mask for use in depositing the low resistance material on the photocathode of an intensifier having eight gated sections.

Figure 6:
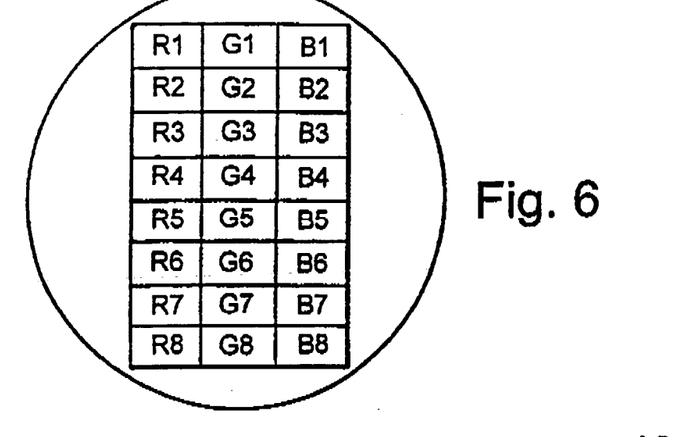
FIG. 6 shows a schematic diagram of an imaging unit of the present invention applied with a colour-separating beam splitter to provide a high speed colour imaging system.

FIG. 6 shows a plan view of a photocathode of an alternative embodiment of the present invention. The photocathode is shown divided into 24 segments R1, G1, B1, R2 and so on up to R8, G8 and B8. In this embodiment the photocathode is segmented into eight rectangular portions which correspond with the numbers 1 to 8 in the figure. This intensifier is intended to be used in a three-colour imaging system. The beam splitter optics are arranged to provide eight spatially displaced but similar beams in one dimension. In the direction at right angles (orthogonal) to that direction, however, a colour dependent effect is provided. The three colour elements of each beam are thus separated for independent detection. Again, the beam splitting optics required to provide this effect is readily obtainable by the relevant engineer simply by adding colour filters to the prism or in any of the optical beams. By gating the eight portions of the intensifier in turn a high speed, eight image, colour imaging arrangement can be provided. Of course, the invention is not restricted to the straightforward colour split between red, green and blue but split colours differently according to the application, i.e. perhaps two colours plus monochrome. Additionally it may be desired, for example, to separate the visible spectrum from the near infra-red. Ultra-violet sensing may also be employed.

Any CCD camera may be used to image the segmented intensifier output, i.e. at resolutions from conventional video through 1K×1K to 2K×2K or more pixels. Not necessarily being rectangular, i.e. EEV CCD 47 is 2048×1024 pixels.

Figure 7:
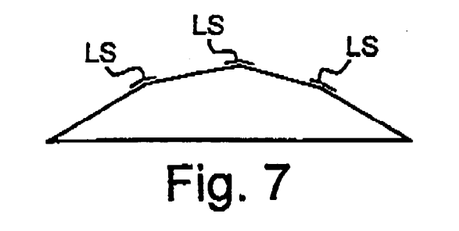
FIG. 7 shows an end view of an optical beam splitter for use in the embodiment shown in FIG. 5.

FIG. 7 shows an end view of an optical beam splitting element for use with one of the aspects of the invention. On one side there are four facets providing four different beams in that dimension (there may be further facets in the dimension perpendicular to the plane of the paper). Between each facet is a small strip LS of light blocking material to prevent the images from being distorted by the beam splitting element at their edges. Other profiles are, of course, possible to provide different numbers of rows of split images. Care must be taken to ensure that equal amounts of energy (or nearly so) are transferred into the split beams for consistent operation between the different image portions of the arrangement. Small differences can be allowed for in the subsequent processing of the image signals.

Of course the present invention is not limited to image intensifiers and optical sensors having four, six or eight portions. It is easier but not essential for the portions to each be accessible from the periphery of the device since this facilitates electrical connection. If a three by three arrangement were provided, for example, the electrical connection to the centre portion might be routed between one of the peripheral portions. This might have adverse effects on the speed of operation or on the completeness of the image(s) captured on either side of the electrical line (see the photocathode mask in FIG. 12 for providing eight gatable portions). Alternatively, capacitive coupling may be employed by a mesh or conductive plate (semi transparent) on the external surface of the photocathode window to gate the otherwise unconnected segment.

Note that in the construction of the intensifier as detailed above, the narrow stripe between two segments, being normal photocathode, will enable the whole intensifier to operate as a single intensifier if this be desired, the stripe appearing as a lighter band (there being no semi transparent material in front of the photocathode in this region) but will otherwise leave the image unaffected. This may have advantages for variable resolution systems, i.e. in a four segment system with a 1K×1K CCD, one image at 1K×1K, two images at 1K×512 or four images at 512×512 pixels—with the use of the appropriate prism/beamsplitter.

Optical gating using Kerr or Pockel cells, for example, may alternatively be used in the imaging arrangement.

What is claimed is:

1. An imaging arrangement adapted to receive two dimensional optical data representative of an object and represented by at least two beams of electromagnetic radiation, the arrangement comprising means for gating and converting the at least two beams into image data includes a single electro-optic device comprising a photosensitive surface, which surface is arranged to comprise a plurality of independently-gatable portions, wherein the independently gatable portions correspond to each of the at least two beams of electromagnetic radiation, each portion being responsive to an image signal, and wherein the means for gating and converting the at least two beams into image data is arranged to provide an image including the object in its entirety to each respective portion of the photosensitive surface.

2. An imaging arrangement as claimed in claim 1, wherein the device comprises an image intensifier.

3. An imaging arrangement as claimed in claim 2, wherein the image intensifier comprises a segmented photocathode.

4. An imaging arrangement as claimed in claim 3, wherein the segmented photocathode comprises a photocathode layer and a segmented conductive layer adjacent the photocathode layer.

5. An imaging arrangement as claimed in claim 2, wherein the image intensifier comprises a photocathode that is controlled capacitively by a segmented, external electrode.

6. An imaging arrangement as claimed in claim 1, wherein the device comprises a solid-state imager.

7. An imaging arrangement as claimed in claim 6, wherein the solid state imager comprises segmented imaging sections.

8. An imaging arrangement as claimed in claim 6, wherein the solid state imager further comprises erasing means for erasing an image corresponding to one of the at least two beams.

9. An imaging arrangement as claimed in claim 6, wherein the solid state imager further comprises overwriting means for overwriting an image corresponding to one of the at least two beams.

10. An imaging arrangement as claimed in claim 1, further comprising means for splitting an incident beam of electromagnetic radiation into at least two beams of electromagnetic radiation for application to the means for gating and converting the at least two beams.

11. An imaging arrangement as claimed in claim 10, wherein the means for splitting the incident beam into a plurality of beams comprises chromatic means for splitting each of the plurality of beams into a plurality of differently-coloured beams.

12. An imaging arrangement as claimed in claim 11, wherein the independently-gated portions of the means for gating and converting the at least two beams into image data correspond with each of the plurality of differently-coloured beams.

13. An imaging arrangement as claimed in claim 1, further comprising means responsive to an event for storing converted image data which was converted before the event.

14. An imaging arrangement for two dimensional optical data representative of an object and represented by an incident beam of electromagnetic radiation, the arrangement comprising:
- means for splitting the incident radiation beam into a plurality of beams,
- means for gating and converting the plurality of beams into image data,
- wherein the means for gating and converting the plurality of beams into image data includes a single electro-optic device comprising a photosensitive surface having independently-gated portions corresponding to each of the plurality of beams, and each of the plurality of beams corresponds to an image including the object in its entirety.

15. A method of imaging two dimensional optical data representative of an object and represented by a beam of electromagnetic radiation, the method comprising:
- splitting the radiation beam into a plurality of beams;
- gating the plurality of beams;
- converting the gated beams into image data;
- wherein the gating of the plurality of beams is performed using a single electro-optic device comprising a photosensitive surface having independently-gated portions corresponding to each of the plurality of beams, and each of the plurality of beams corresponds to an image including the object in its entirety.

16. An imaging arrangement adapted to receive a plurality of images representative of an object, said imaging arrangement comprising:
- an electro-optic device comprising a photosensitive surface, which surface is arranged to comprise a plurality of independently-gatable portions, wherein each respective portion of the photosensitive surface is arranged to gate an image including the object in its entirety, and the electro-optic device is arranged to output the image including the object in its entirety from each respective portion of the photosensitive surface.

17. An imaging arrangement adapted to receive a plurality of images representative of an object, said imaging arrangement comprising:
- an electro-optic device comprising a photosensitive surface, which surface is arranged to comprise a plurality of independently-gatable portions, wherein each respective portion of the photosensitive surface is arranged to gate an image including the object in its entirety, and the electro-optic device is arranged to output image data corresponding to the image including the object in its entirety from each respective portion of the photosensitive surface.

* * * * *